United States Patent
Bonhomme et al.

(10) Patent No.: US 12,486,805 B2
(45) Date of Patent: Dec. 2, 2025

(54) METHOD FOR CONTROLLING THE ENERGY SET-UP OF A HYBRID PROPULSION SYSTEM

(71) Applicant: SAFRAN, Paris (FR)

(72) Inventors: Damien Jacques Arthur Bonhomme, Moissy-Cramayel (FR); Victor Dos Santos, Moissy-Cramayel (FR); Ana Truc-Hermel, Moissy-Cramayel (FR); Guillaume François Daniel Bidan, Moissy-Cramayel (FR)

(73) Assignee: SAFRAN, Paris (FR)

( * ) Notice: Subject to any disclaimer, the term of this patent is extended or adjusted under 35 U.S.C. 154(b) by 135 days.

(21) Appl. No.: 18/575,661

(22) PCT Filed: Jun. 20, 2022

(86) PCT No.: PCT/FR2022/051197
§ 371 (c)(1),
(2) Date: Dec. 29, 2023

(87) PCT Pub. No.: WO2023/275454
PCT Pub. Date: Jan. 5, 2023

(65) Prior Publication Data
US 2024/0383611 A1 Nov. 21, 2024

(30) Foreign Application Priority Data
Jun. 30, 2021 (FR) ........................................ 2107075

(51) Int. Cl.
*F02C 7/36* (2006.01)
*B64D 27/33* (2024.01)
(Continued)

(52) U.S. Cl.
CPC ................ *F02C 7/36* (2013.01); *B64D 27/33* (2024.01); *B64D 31/06* (2013.01); *B64D 2041/005* (2013.01); *B64D 2221/00* (2013.01)

(58) Field of Classification Search
CPC ..... F02C 7/36; F02C 6/14; F02C 9/28; B64D 27/33; B64D 31/06; B64D 2041/005;
(Continued)

(56) References Cited

U.S. PATENT DOCUMENTS 10,233,768 B1   3/2019  Watts, III et al.
11,312,256 B2 *  4/2022  Vinson .................. B64D 31/18
(Continued)

FOREIGN PATENT DOCUMENTS

EP          3290680 A1    3/2018

OTHER PUBLICATIONS

Search Report and Written Opinion issued in International Application No. PCT/FR2022/051197, mailed on Sep. 27, 2022.
(Continued)

*Primary Examiner* — Valentina Xavier
(74) *Attorney, Agent, or Firm* — Bookoff McAndrews, PLLC

(57) ABSTRACT

A method of control of a power generation and control system of an aircraft including: a hybrid propulsion system including an electrical network and a propulsive energy source, at least one non-propulsive energy source, a control unit of the hybrid propulsion system, and an overall aircraft power control unit, characterized in that the method includes: the determination of an operability limit of the propulsive energy source, the monitoring of the operability of the propulsive energy source by the control unit of the hybrid propulsion system, and the control of a power generated by the propulsive energy source by the overall aircraft power control unit when the operability of the propulsive
(Continued)

energy source is less than said determined operability limit or the control of a power generated by the propulsive energy source by the control unit of the hybrid propulsion system.

13 Claims, 4 Drawing Sheets

(51) Int. Cl.
*B64D 31/06* (2006.01)
*B64D 41/00* (2006.01)

(58) Field of Classification Search
CPC ... B64D 2221/00; F02K 5/00; F05D 2220/60; F05D 2220/76; F05D 2260/42; F05D 2270/20; F05D 2270/335
See application file for complete search history.

(56) References Cited

U.S. PATENT DOCUMENTS

| | | | |
|---|---|---|---|
| 2018/0291807 A1* | 10/2018 | Dalal | B64D 27/33 |
| 2019/0002113 A1 | 1/2019 | Gansler et al. | |
| 2020/0392859 A1 | 12/2020 | Turner | |
| 2022/0290576 A1* | 9/2022 | Ota | F02K 5/00 |

OTHER PUBLICATIONS

Search Report issued in French Application No. 2107075, mailed Mar. 16, 2022.

* cited by examiner

[Fig. 1]
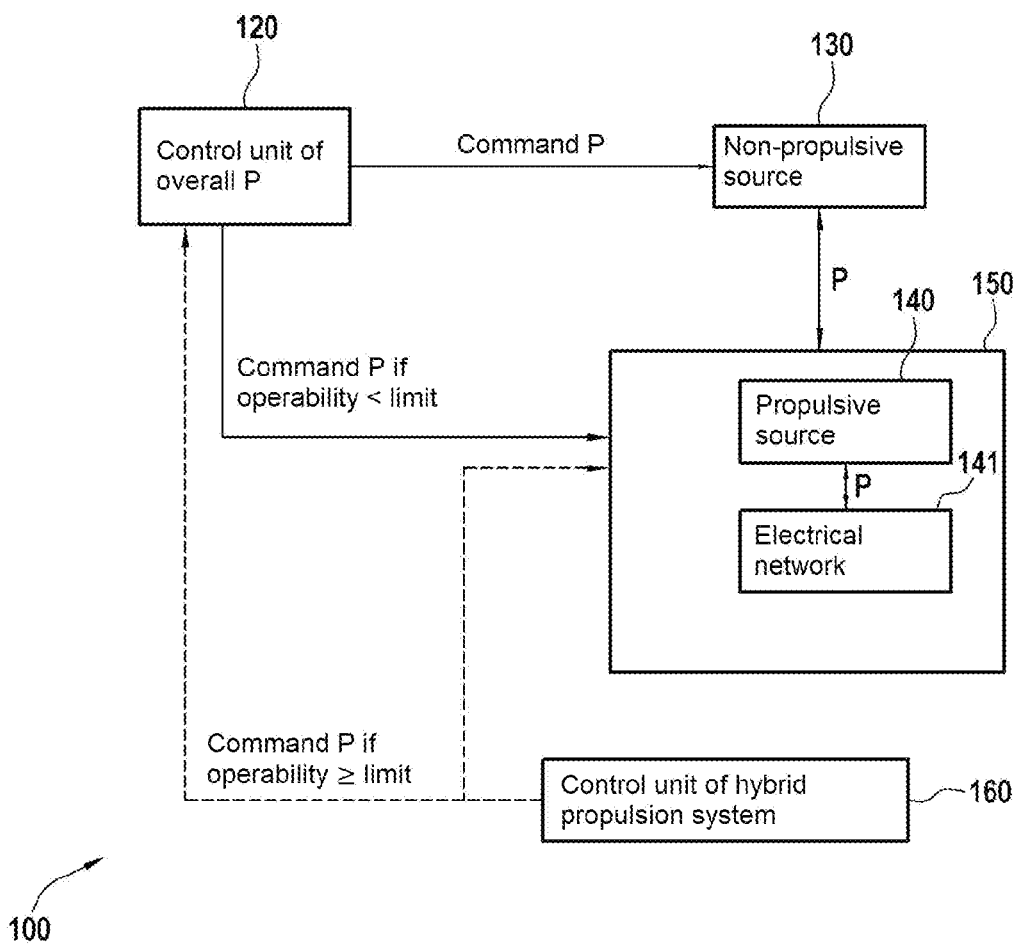

[Fig. 2]
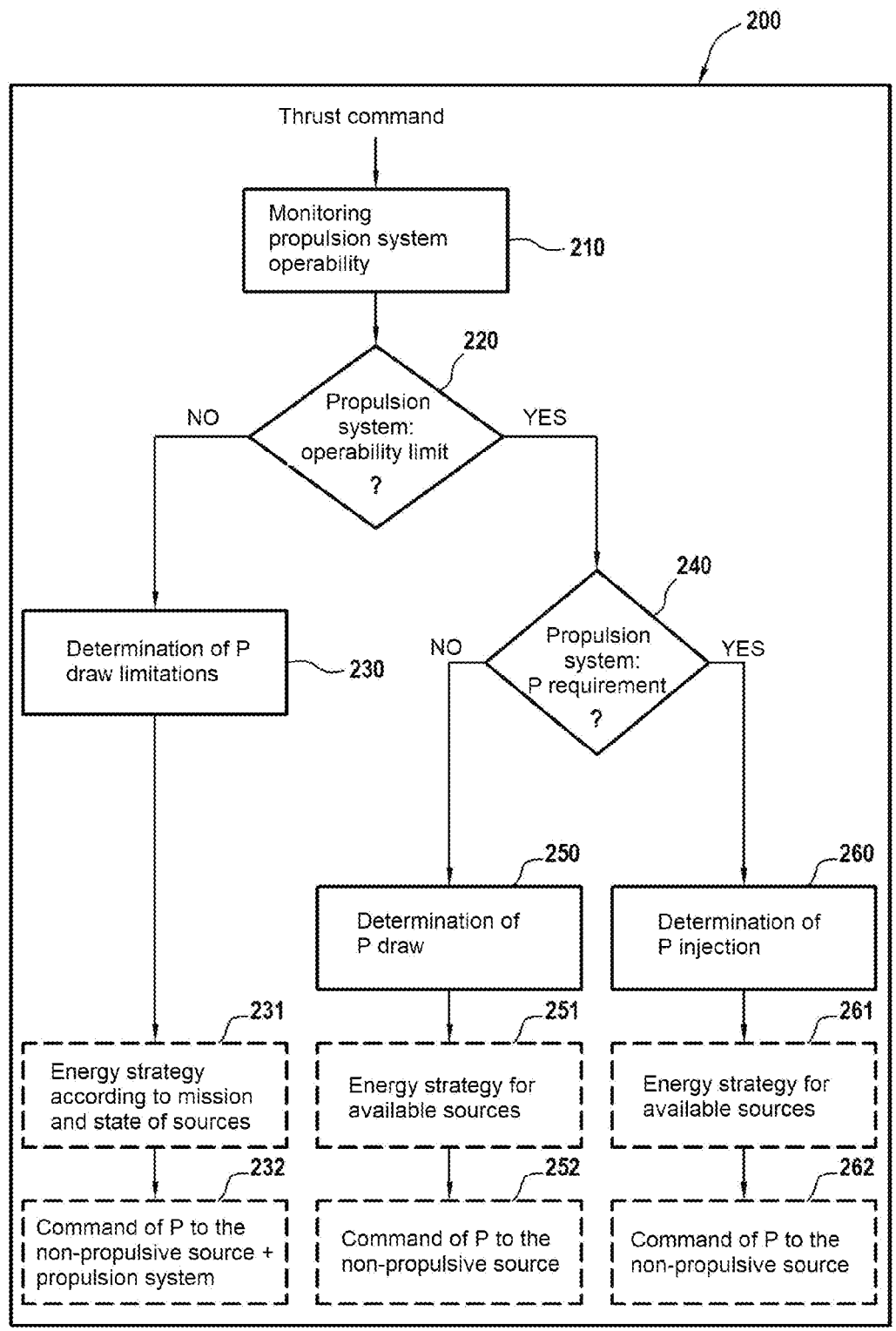

[Fig. 3]
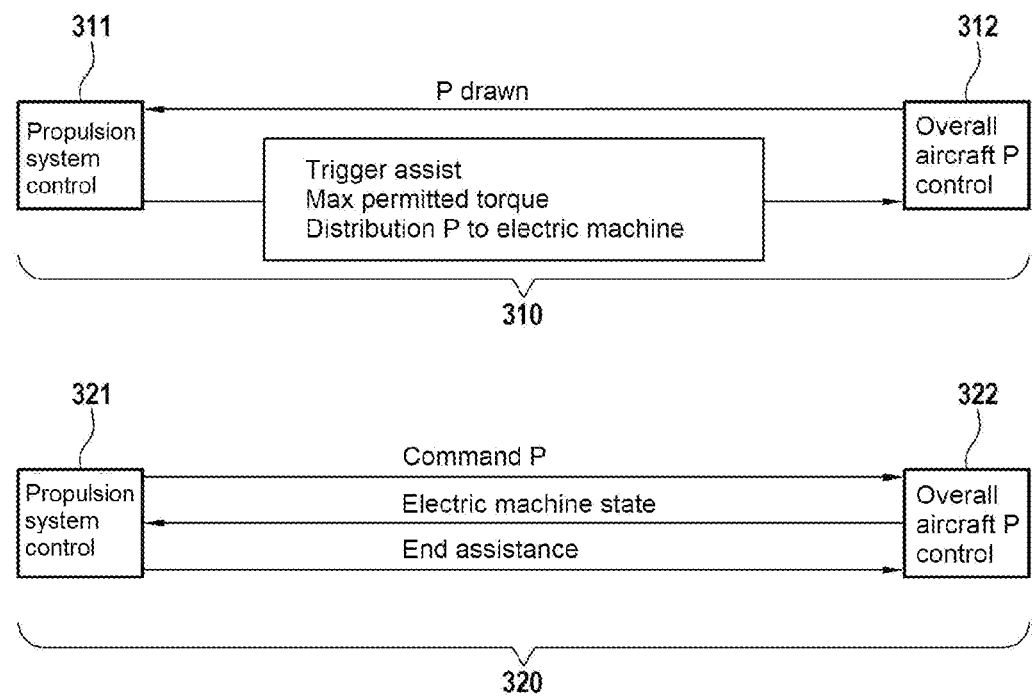

[Fig. 4]
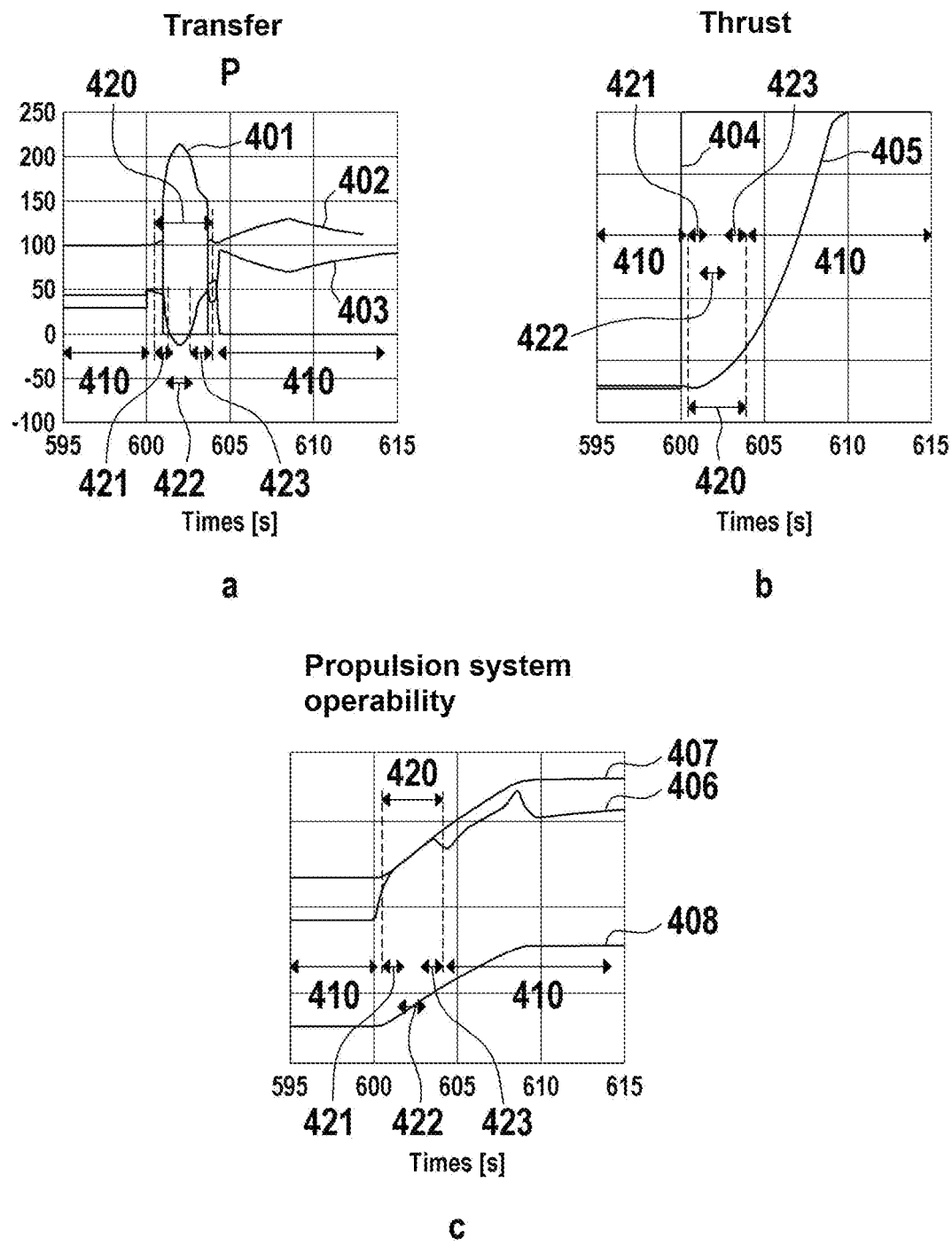

METHOD FOR CONTROLLING THE ENERGY SET-UP OF A HYBRID PROPULSION SYSTEM

CROSS-REFERENCE TO RELATED APPLICATIONS

This is a National Stage Application under 35 U.S.C. § 371 of International Application No. PCT/FR2022/051197, filed Jun. 20, 2022, now published as WO 2023/275454 A1, which claims priority to French Patent Application No. 2107075, filed on Jun. 30, 2021.

TECHNICAL FIELD

This invention relates to the general field of the regulation of propulsive and non-propulsive aircraft systems, and especially the control of an energy architecture of a hybrid propulsion system.

PRIOR ART

The hybridization of an aircraft propulsion system, such as a turbofan, is advantageous if it makes it possible to remove limitations on the dimensioning of the power sources. Specifically, to remove limitations on the dimensioning of the hybrid propulsion system, it is necessary to guarantee the availability of electrical power to the propulsive energy sources, and to guarantee a level of power draw off these propulsive sources to limit the mass of the auxiliary sources.

The control of the non-propulsive energy sources and of the electric machines on the engine shafts then meets a dual requirement:
- guaranteeing and regulating the operability and performance of the propulsion system, and
- regulating the overall energy system of the aircraft to ensure the stability of the electrical network of the hybrid propulsion system.

These two requirements control the power injected into or drawn off the propulsion system, with objectives that may come into conflict with one another during a mission:
- to maintain the specified level of performance, the propulsion system can request an injection of power from the overall energy system of the aircraft, and
- to supply power to the loads, the overall energy system of the aircraft can request a power draw off the propulsion system.

The two levels of control (of the propulsion system and of the overall energy system of the aircraft) must therefore communicate with one another to ensure the overall viability of the energy architecture and the optimization of the power draws.

For a hybrid architecture of a turbofan, the patent EP 3 290 680 thus makes provision for triggering an assist to the propulsion system (turbomachine) if an operability limit of the turbomachine is attained or exceeded. The architecture is then limited to two operating modes: either the electrical network controls the power it draws off the turbomachine, or the turbomachine controls the power it draws off the electrical network. The transition between the two modes then causes the switchover of the control authority and the reversal of the power flow (draw or injection of power off or into the turbomachine). This creates a problem of stability of the electrical network and of availability of the power for guaranteeing the operability of the turbomachine.

It is therefore desirable to have a method of control of an energy architecture of an aircraft making it possible to ensure the stability of the overall energy network and the availability of power to assist the hybrid propulsion system.

SUMMARY OF THE INVENTION

The invention relates to a method of control of a power generation and control system of an aircraft comprising:
- a hybrid propulsion system comprising an electrical network and a propulsive energy source,
- at least one non-propulsive energy source,
- a control unit of the hybrid propulsion system, and
- an overall aircraft power control unit, characterized in that the method comprises:
- the determination of an operability limit of the propulsive energy source,
- the monitoring of the operability of the propulsive energy source by the control unit of the hybrid propulsion system, and
- the control of a power generated by the propulsive energy source by the overall aircraft power control unit when the operability of the propulsive energy source is less than said determined operability limit or the control of a power generated by the propulsive energy source by the control unit of the hybrid propulsion system when the operability of the propulsive energy source reaches or exceeds said determined operability limit.

The energy architecture of the aircraft thus changes from a control exerted by the control unit of the hybrid propulsion system to a control exerted by the overall aircraft power control unit and conversely, depending on the operability and the determined operability limit of the propulsive energy source, the operability limit being for example able to be a surge margin, or a limit temperature or a flameout limit, etc.

According to a particular feature of the invention, the method also comprises the control of a power generated by the electrical network and supplied to the propulsive energy source by the control unit of the hybrid propulsion system when the operability of the propulsive energy source reaches or exceeds said determined operability limit.

Thus during an engine acceleration phase of the aircraft, during the initial state, the control of the power generated by the hybrid propulsion system is carried out by the overall aircraft power control unit, then when the determined operability limit is reached, the control of the power is carried out by the control unit of the hybrid propulsion system. This makes it possible to guarantee the operability of the hybrid propulsion system, the continuity of the power transferred to the electrical network and the overall effectiveness of the energy architecture of the aircraft.

Owing to the invention, the operability of the propulsion system is guaranteed. The control of the stability of the electrical network is facilitated by the continuity of the power draws when a first operability stop of the propulsion system is reached.

In addition, owing to the control exerted directly by the control unit of the hybrid propulsion system, the power draws from the propulsion system to the electrical network can be maximized, which makes it possible to maximize the overall energy efficiency of the architecture.

According to another particular feature of the invention, the method also comprises:
- the determination of an energy strategy depending on the operability of the propulsive energy source and the availability of the electrical network and of the non-propulsive energy sources, the application of the determined energy strategy by generating power commands for the non-propulsive energy sources by the overall aircraft power control unit, and by generating power commands for the propulsive energy source and the electrical network by the control unit of the hybrid propulsion system when the operability of the propulsive energy source reaches or exceeds said determined operability limit, or by the overall aircraft power control unit when the operability of the propulsive energy source is less than said determined operability limit.

According to another particular feature of the invention, the transition between the control of the power generated by the propulsive energy source by the overall aircraft power control unit or by the control unit of the hybrid propulsion system depending on the operability of the propulsive energy source is carried out by the control unit of the hybrid propulsion system.

Another subject of the invention is a power generation and control system for the implementation of the method according to the invention, the system comprising:
- a hybrid propulsion system comprising an electrical network and a propulsive energy source,
- at least one non-propulsive energy source,
- a control unit of the hybrid propulsion system, and
- an overall aircraft power control unit.

According to a particular feature of the invention, the propulsive energy source is a turbojet or a turboprop.

According to another particular feature of the invention, the non-propulsive energy source comprises at least one turbomachine, an energy storage means or a fuel cell.

Yet another subject of the invention is an aircraft comprising a power generation and control system according to the invention.

BRIEF DESCRIPTION OF THE DRAWINGS

Other features and advantages of this invention will become apparent from the description given below, with reference to the appended drawings which illustrate exemplary embodiments thereof without any limitation.

FIG. 1 shows, schematically and partially, a power generation and control system of an aircraft according to an embodiment of the invention.

FIG. 2 shows, schematically, a method of control of an aircraft architecture comprising a propulsion system and at least one non-propulsive energy source according to an embodiment of the invention.

FIG. 3 shows, schematically and partially, the interfacing between the power control units of the propulsion system and of the overall aircraft power according to an embodiment of the invention.

FIG. 4 shows, schematically, an application of the method of control of the power of an aircraft over an acceleration phase according to an embodiment of the invention.

DESCRIPTION OF THE EMBODIMENTS

In the entire description, the electrical network comprises at least one electric machine making it possible to convert an electrical power into a mechanical power and conversely. For example, the electric machine converts a mechanical power generated by the hybrid propulsion system or by a non-propulsive energy source into an electrical power usable for the electrical network.

FIG. 1 shows, schematically and partially, a power generation and control system 100 of an aircraft for the implementation of the method of the invention.

The system 100 comprises a hybrid propulsion system 150 comprising a propulsive energy source 140 and an electrical network 141. The system 100 also comprises a control unit of the hybrid propulsion system 160, at least one non-propulsive energy source 130 and a control unit 120 of the overall aircraft power.

The control unit of the hybrid propulsion system 160 is configured to control a transfer of power P from the propulsion source 140 to the electrical network 141 and/or from the electrical network 141 to the propulsion source 140, when the propulsive energy source 140 reaches an operability limit. To do this, it sends a command of power P to the control unit 120 of the overall aircraft power which transmits this command to an electric machine that will convert a mechanical power of the propulsive energy source 140 into electrical power for the electrical network 141 or conversely.

The operability limits are determined by the control unit of the hybrid propulsion system 160 which ensures the monitoring of the state of the propulsion system 150 and therefore determines whether or not a limit is effectively reached during the flight. The state of the propulsion system 150 is a function of the thrust control and the flight conditions.

The control unit 120 of the overall aircraft power is configured to control a transfer of power P between the propulsive energy source 140 and the electrical network 141 when the propulsive energy source 140 has not yet reached an operability limit. To do this, it sends a command of power P to the hybrid propulsion system 150.

FIG. 2 shows, schematically, a method 200 of control of an energy architecture of an aircraft 100, as shown in FIG. 1, according to an embodiment of the invention.

The energy architecture comprises at least one hybrid propulsion system comprising a propulsive energy source and an electrical network, and at least one non-propulsive energy source. A control unit of the hybrid propulsion system and an overall aircraft power control unit are used to control the energy architecture according to the method of the invention described below.

The hybrid propulsion system is started by a thrust command. During its entire operation, the operability of the propulsive energy source is monitored 210 to know whether or not it is at the operability limit 220.

As long as the propulsive energy source is below its operability limit, the energy architecture of the aircraft is said to be in a conventional mode (mode 310 of FIG. 3). In the conventional mode 310, the control unit 312 of the overall aircraft power controls the power drawn off the hybrid propulsion system, particularly off the propulsive energy source; while the control unit of the hybrid propulsion system 311 controls the distribution of power between the electric machines converting mechanical powers into electrical power and conversely, the maximum permissible torques and can trigger an assist mode (mode 320) when its operability limit is reached. Thus, the control unit 312 of the overall aircraft power establishes and sends 232 power commands to the hybrid propulsion system, the non-propulsive energy sources and the electric machines according to the power draw limitations transmitted 230 by the control unit of the hybrid propulsion system and the state of the propulsive energy source, the state of the non-propulsive energy sources, the state of the electric machines and the mission data 231.

As soon as the propulsive energy source reaches or exceeds its operability limit, the energy architecture then changes to assist mode (mode 320 in FIG. 3). In this mode, the control unit of the hybrid propulsion system 321 controls the power drawn off or injected into the propulsive energy source. Specifically, the propulsive energy source can be a power source or load for the energy architecture of the aircraft. It is also the control unit of the hybrid propulsion system 321 which indicates to the control unit 322 of the overall aircraft power the end of the assist mode 320. The control unit 322 of the overall aircraft power sends information about the state of the non-propulsive energy sources and of the electric machines to the control unit of the hybrid propulsion system 321.

When the propulsive energy source of the hybrid propulsion system is at the operability limit, it is necessary to determine whether or not it requires an injection of power 240 from its electrical network. If an injection of power is necessary, the control unit of the hybrid propulsion system determines the power 260 requirements of the propulsion source and transmits the corresponding power commands to the electrical network and to the overall aircraft power control unit which establishes 261 and sends the power commands 262 to the non-propulsive sources according to an energy strategy established according to the mission data.

If the propulsive energy source does not require any power injection, then the propulsive energy source is a source of power for the aircraft. The control unit of the hybrid propulsion system then determines the power to be drawn 250 off the propulsive energy source and transmits the corresponding power commands to the overall aircraft power control unit. The overall aircraft power control unit establishes 251 and sends the power commands 252 to electric machines converting the power generated by the propulsive energy source according to an energy strategy established as a function of the mission data.

FIG. 4 shows, schematically, an application of the power control method over an acceleration phase of an aircraft, comprising at least one non-propulsive energy source and a hybrid propulsion system comprising a propulsive energy source and an electrical network, according to an embodiment of the invention.

The graph a represents the power transfer as a function of time between electric machines 401 converting the power exchanged between the non-propulsive energy sources and the electrical network and the main shaft of the propulsion system 403 and the secondary shaft of the propulsion system 402, both propulsive energy sources (primary shaft and secondary shaft) belonging to the hybrid propulsion system.

The graph b represents the thrust 405 of the aircraft as a function of time. The thrust setpoint is represented by a scale 404 between a minimum value and a required maximum value. This thrust 405 shows the acceleration phase of the aircraft.

The graph c represents the operability 406 of the propulsion system, as a function of time. The operability 406 of the propulsive energy sources must be between a lower limit 408 and an upper limit 407.

As long as the operability of the propulsive energy sources 406 remains between its minimum 408 and maximum 407 values, the conventional mode 410 is implemented and the control of the power generated by the propulsive energy sources is carried out by the overall aircraft power control unit. When the operability of the propulsive energy sources 406 exceeds its upper limit 407, the assist mode 420 is implemented and the control of the power generated or injected into the propulsive energy sources is carried out by the control unit of the hybrid propulsion system. The change from the conventional mode 410 to the assist mode 420 involves a decrease in the power draws off the propulsion system, then a power injection into the propulsion system 401 (graph a). The return from the assist mode 420 to the conventional mode 410 is done on exiting the upper operability limit 407 of the propulsive energy sources with a return to the initial power draws. Specifically, on the graph a, the power draws 401, 402 and 403 at t=600 s (transition between the conventional mode 410 and the assist mode 420) are identical to those of t=604 s (transition between the assist mode 420 and the conventional mode 410).

In addition, in the assist mode 420, the propulsive energy sources supply power to the electric machines or receive power from the electrical network included in the hybrid propulsion system. Thus on the graph a, in the assist mode 420, it can be seen that the propulsive energy sources supply, firstly, power to the electric machines 421, then secondly they receive power 422 from the electrical network of the hybrid propulsion system and finally, thirdly, just before returning to the conventional mode 410, the propulsive energy sources supply power to the electric machines 423.

The control method according to the invention can be applied whatever the number of electric machines installed in the aircraft, whatever the nature of the non-propulsive energy sources, whatever the type of electrical network included in the hybrid propulsion system, and whatever the number of drive shafts of the hybrid propulsion system.

The hybrid propulsion system may comprise a turbomachine, for example a turboprop or a turbofan.

The non-propulsive energy sources may comprise at least one fuel cell, an energy storage means, such as for example a battery, or else a turbomachine.

In addition, the operability limit of the propulsive energy sources of the hybrid propulsion system which determines the transition from one mode to the other can be a surge margin, a limit temperature or else a flameout limit.

The invention claimed is:

1. A method of control of a power generation and control system of an aircraft comprising:
    a hybrid propulsion system comprising an electrical network and a propulsive energy source,
    at least one non-propulsive energy source, a control unit of the hybrid propulsion system, and
    an overall aircraft power control unit,
    wherein the method comprises:
    a determination of an operability limit of the propulsive energy source,
    monitoring of the operability of the propulsive energy source by the control unit of the hybrid propulsion system, and
    the control of a power generated by the propulsive energy source by the overall aircraft power control unit when the operability of the propulsive energy source is less than said determined operability limit or the control of a power generated by the propulsive energy source by the control unit of the hybrid propulsion system when the operability of the propulsive energy source reaches or exceeds said determined operability limit.

2. The method of control of a power generation system as claimed in claim 1, also comprising the control of a power generated by the electrical network and supplied to the propulsive energy source by the control unit of the hybrid propulsion system when the operability of the propulsive energy source reaches or exceeds said determined operability limit.

3. The method of control of a power generation system as claimed in claim 1, also comprising:
the determination of an energy strategy depending on the operability of the propulsive energy source and an availability of the electrical network and of the non-propulsive energy sources,
an application of the determined energy strategy by generating power commands for the non-propulsive energy sources by the overall aircraft power control unit, and by generating power commands for the propulsive energy source and the electrical network by the control unit of the hybrid propulsion system when the operability of the propulsive energy source reaches or exceeds said determined operability limit, or by the overall aircraft power control unit when the operability of the propulsive energy source is less than said determined operability limit.

4. The method of control of a power generation system as claimed in claim 1, wherein a transition between the control of the power generated by the propulsive energy source by the overall aircraft power control unit or by the control unit of the hybrid propulsion system depending on the operability of the propulsive energy source is carried out by the control unit of the hybrid propulsion system.

5. The method of control of a power generation system as claimed in claim 1, wherein the operability limit of the propulsive energy source is a surge margin or a limit temperature or a flame-out limit.

6. A power generation and control system for an implementation of the method as claimed in claim 1, the system comprising:
a hybrid propulsion system comprising an electrical network and a propulsive energy source,
at least one non-propulsive energy source,
a control unit of the hybrid propulsion system, and
an overall aircraft power control unit.

7. The power generation and control system as claimed in claim 6, wherein the propulsive energy source is a turbojet or a turboprop.

8. The power generation and control system as claimed in claim 6, wherein the non-propulsive energy source comprises at least one turbomachine, an energy storage means or a fuel cell.

9. An aircraft comprising a power generation and control system as claimed in claim 6.

10. The method of claim 1, wherein the hybrid propulsion system is operated in a conventional mode when the operability of the propulsive energy source is below the operability limit, in which the overall aircraft power control unit controls the power drawn from the propulsive energy source and the control unit of the hybrid propulsion system controls a distribution of power between electric machines of the electrical network.

11. The method of claim 10, wherein upon the operability of the propulsive energy source reaching or exceeding the operability limit, the hybrid propulsion system transitions to an assist mode in which the control unit of the hybrid propulsion system controls the power drawn off or injected into the propulsive energy source.

12. The method of claim 11, wherein during the assist mode, the propulsive energy source operates as a power source or as a power load for the hybrid propulsion system.

13. The method of claim 11, wherein a transition from the assist mode back to the conventional mode is triggered by the operability of the propulsive energy source returning below the operability limit with restoration of an initial power draw from the propulsive energy source.

* * * * *